(No Model.)
P. V. P. BERG.
CENTRIFUGAL MILK TESTER.
No. 506,838.  Patented Oct. 17, 1893.
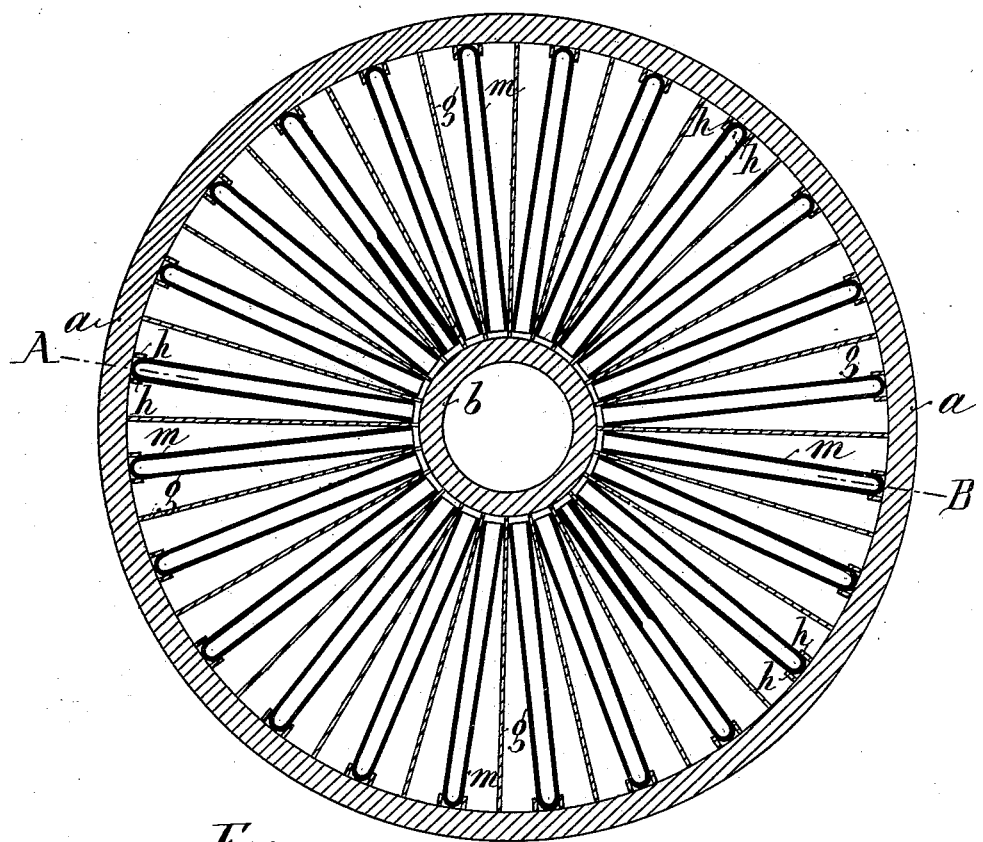
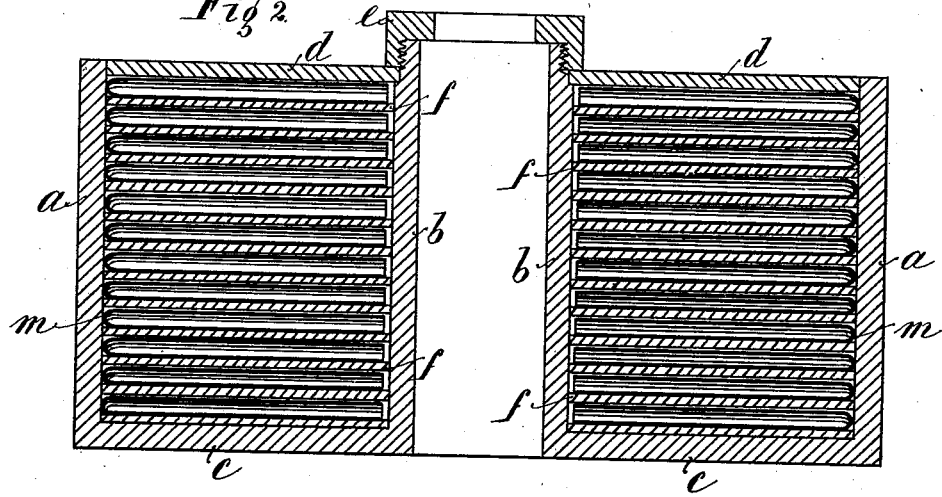
WITNESSES:
Charles Schroeder
Adolph Scherer
INVENTOR
P. V. P. Berg
by Guepel & Raegener
ATTORNEYS.

UNITED STATES PATENT OFFICE.

PETER VRAA POVLSEN BERG, OF COPENHAGEN, DENMARK.

CENTRIFUGAL MILK-TESTER.

SPECIFICATION forming part of Letters Patent No. 506,838, dated October 17, 1893.

Application filed April 13, 1893. Serial No. 470,177. (No model.)

*To all whom it may concern:*

Be it known that I, PETER VRAA POVLSEN BERG, of Copenhagen, Denmark, have invented certain new and useful Improvements in Apparatus for Testing the Cream Percentage of Milk, of which the folowing is a specification.

The object of this invention is to provide a new and improved device for separating in a simple manner and by mechanical means and centrifugal force the cream from milk, and thereby indirectly the butter contained in milk, to permit of ascertaining and measuring the quantity of cream in milk furnished by any person and also the amount of cream in the milk from each cow.

In the accompanying drawings, Figure 1 is a horizontal sectional view of my improved apparatus for measuring the amount of cream and fatty substances in milk, and Fig. 2 is a vertical transverse sectional view on the line A, B, Fig. 1.

Similar letters of reference indicate corresponding parts.

The apparatus is constructed with an exterior cylinder $a$ and an interior cylinder $b$, which are connected by the bottom $c$ with each other. It is provided with a cover $d$ that is held in place by a screw cap $e$, and it is also provided with a greater or less number of disks or horizontal partitions $f$, (in this case twelve,) the combined height of which is equal to the distance between the bottom and the cover. The number of these disks is limited in so far as the height of the apparatus must not be quite as great as the transverse dimensions, if the apparatus is to be properly balanced, that is, if the apparatus is to be attached loosely to the end of its axis. In practice, this limitation is of no value, as the apparatus can be constructed with twenty-five disks or partitions, each containing twenty-four test tubes, in all six hundred test tubes without reaching this maximum height.

These test-tubes may be provided with a contraction at the open end, and this contraction may extend throughout about half the length of the tube, as shown in the two tubes opposite each other on the diagonal line, Fig. 1, running from the upper left hand corner to the lower right hand corner. The milk and cream does not run out of tubes of this kind, when the same are placed horizontally or even inverted, as the milk and cream are held in the same by air-pressure, and capillary attraction.

The exterior and interior cylinders, with the bottom by which they are connected with each other, consist of a single piece of metal having an opening in the inner cylinder for receiving a loose or fixed shaft or axle, which interior cylinder also has an exterior screw thread on the upper end for receiving the screw-cap. By means of the screw-cap, the cover is held in place, with the inner edge resting on an annular recess on the upper end of the interior cylinder, and serves to hold the disks and the test glasses on the same in place. The said disks are annular in shape, and thus each has a central opening through which the inner cylinder can pass, and each has a series of radial ribs $g$ that are arranged at right-angles to the planes of the disks.

Between each two ribs and at the outer end of the disk, vertical ribs $h$ are arranged, which pass through recesses on the outer edge of the disk, and rest against the inner surface of the cylinder $a$. They are not attached to the cylinder nor to the disks, and extend from top to bottom of the cylinder. Said disks, with the ribs $g$, are made of a single piece of metal and with the vertical ribs serve as supports for the test tubes $m$, whereby the latter are held in exactly radial and horizontal position and cannot be crushed during the rotation of the apparatus, and said disks also serve in connection with the inner and outer cylinder, to hold the test tubes separate. The space between the cylinders is filled with disks and test glass alternately and then the cover is secured. Then the apparatus is rotated between five-thousand and seven thousand revolutions per minute, either by means of a suitable hand-power device or by means of a centrifugal machine. The cream will then separate in several minutes, from the milk in the test glasses, which test tubes are filled almost entirely with milk, and in consequence of the less specific gravity, the cream will accumulate in those ends of the test tubes nearest the axis of the machine. The height of the compact cream in the test tubes is then measured by means of an apparatus constructed for this purpose, and the glasses arranged according to their numbers that they have received upon being placed in the apparatus, are placed in a suitable holder.

The apparatus, in view of its being closed, its circular shape, the simplicity of its construction and the strength and resistance of its material, is almost entirely indestructible and absolutely not dangerous during use. It can be rotated as high as seven thousand times per minute, which is the greatest speed of a centrifugal machine, without bursting. It can thus be used on the axis of almost any centrifugal machine, without requiring any change in the gearing, and as it presents very little resistance to the air during rotation, very little power is required, and it can be even rotated by hand. As a great quantity of the tubes containing milk from different sources can be tested at the same time, and the test for the contents of each tube is precisely the same as that of all others, much time can be saved. The extraordinarily great speed of the machine counteracts the influence of capillarity on the surface of the cream, so that an absolutely clear and distinct line of demarkation between the cream and milk is formed. This enables precise measurements being taken of the height of the column of cream, which height has a fixed relation to the contents of cream or butter in the milk.

Having thus described my invention, I claim as new and desire to secure by Letters Patent—

1. The combination, with an exterior and interior cylinder connected with each other by a bottom, of a cover plate, a series of horizontal partitions between the bottom of the apparatus and the cover plate, which partitions are provided with radial ribs, substantially as set forth.

2. The combination, with an exterior and interior cylinder connected with each other by a bottom, of a cover plate, a series of horizontal partitions between the bottom of the apparatus and the cover plate, which partitions are provided with radial ribs, and at their outer ends with guide lugs between each two partitions, substantially as set forth.

3. The combination, with an exterior and interior cylinder connected with each other by a bottom, the top of the interior cylinder being screw threaded, of a series of horizontal partitions placed between the bottom of the apparatus and the cover, which partitions have radial ribs, guide lugs between the ribs at their outer ends and a screw cap screwed on the upper end of the interior cylinder for holding the several partitions in place, substantially as set forth.

4. The combination, with an exterior and interior cylinder connected by a bottom, of a series of horizontal partitions in said cylinder, which partitions are provided with radial ribs and with guide lugs for glass tubes, tubes on the several partitions between the ribs and having their outer ends resting between the guide lugs, a cover on said outer cylinder and a screw cap screwed on the upper end of the inner cylinder, substantially as set forth.

In testimony that I claim the foregoing as my invention I have signed my name in presence of two subscribing witnesses.

PETER VRAA POVLSEN BERG.

Witnesses:
J. HOFMAN BAUZ,
FRITZ TOZHERS.